United States Patent [19]
Ikegaya et al.

[11] Patent Number: 5,338,093
[45] Date of Patent: Aug. 16, 1994

[54] SEAT RECLINING APPARATUS

[75] Inventors: Isao Ikegaya; Kunihisa Sugimoto, both of Kosai, Japan

[73] Assignee: Fujikiko Kabushiki Kaisha, Tokyo, Japan

[21] Appl. No.: 858,610

[22] Filed: Mar. 27, 1992

[30] Foreign Application Priority Data

Mar. 29, 1991 [JP] Japan .................. 3-020123[U]
Mar. 29, 1991 [JP] Japan .................. 3-020131[U]
Mar. 29, 1991 [JP] Japan .................. 3-020132[U]

[51] Int. Cl.5 ......................................... B60N 2/20
[52] U.S. Cl. ............................ 297/367; 297/354.1
[58] Field of Search ............ 297/366, 367, 368, 369, 297/370, 371, 372, 378, 379, 340, 341, 342, 365, 378.1, 354.1

[56] References Cited

U.S. PATENT DOCUMENTS

| 3,829,156 | 8/1974 | Iida et al. | 297/379 X |
| 4,146,267 | 3/1979 | Mori et al. | 297/367 |
| 4,394,048 | 7/1983 | Sakurai et al. | 297/367 |
| 4,762,366 | 8/1988 | Bauer et al. | 297/367 |
| 4,775,186 | 10/1988 | Nishino | 297/367 |
| 4,913,494 | 4/1990 | Ikegaya | 297/367 |

FOREIGN PATENT DOCUMENTS 2606337 11/1986 France .
0727335 11/1952 United Kingdom .
2017806 3/1979 United Kingdom .
2196052 10/1986 United Kingdom .

Primary Examiner—Kenneth J. Dorner
Assistant Examiner—Milton Nelson, Jr.
Attorney, Agent, or Firm—Hopkins & Thomas

[57] ABSTRACT

A seat reclining apparatus for adjusting an inclining angle of a seat back to a seat cushion is provided with a base plate secured to the seat cushion. An arm is secured to the seat back and is pivotably supported by the base plate. An upper tooth is secured to the arm, while a lower tooth for engaging the upper tooth is pivotably supported by the base plate. An operating structure is pivotably supported by the base plate, which operating structure operates the lower tooth to engage and disengage the lower tooth and the upper tooth.

3 Claims, 8 Drawing Sheets

SEAT RECLINING APPARATUS

BACKGROUND OF THE INVENTION

This invention relates to a seat reclining apparatus, in particular to a seat reclining apparatus with a latch type lock structure.

This kind of seat reclining apparatus is provided with a pair of base plates secured to both sides of a seat cushion respectively. A pair of arms are pivotably supported by the base plates, a pair of upper teeth are secured to the arms, and a pair of lower teeth are pivotably supported by the base plates respectively. Each lower tooth engages and disengages the upper tooth by a operating member. These base plates, arms, upper teeth, lower teeth and operating members constitute a lock structure. The operating members are manipulated by operating an operating lever to lock and unlock the seat reclining apparatus.

In the seat reclining apparatus described above, the lock structure is located inside the base plates (seat cushion side) in order to increase the effective inner width of the seat cushion to the maximum. Upper rails constituting a seat slide structure are also located inside the base plates.

However, in the conventional seat reclining apparatus, the upper rail must be positioned sufficiently apart from the pivotal center of the lower tooth, in order to prevent the lower tooth from contacting the upper rail when the lower tooth pivots downward when the lock is released in the lock structure. Consequently, the base plate is enlarged to enlarge the seat reclining apparatus as a whole.

Moreover, the conventional seat reclining apparatus requires a rim portion to secure the upper rail to the base plate. For this reason, the base plate must be moved outwardly to increase the entire width of the seat. Consequently, it is difficult to set the base plate at predetermined setting position, so that the effective inner width of the seat cushion is reduced.

Further, in the conventional seat reclining apparatus, the tooth portion of the upper tooth is not covered, so that the tooth portion contacts the seat cushion, fouling it with oil supplied to the tooth portion.

SUMMARY OF THE INVENTION

An object of this invention is to eliminate or improve the defects or drawbacks encountered in the prior art and to provide a seat reclining apparatus in which the setting position of the upper fall to the base plate is located as close as possible to the pivotal center of the lower tooth.

Another object of this invention is to provide a seat reclining apparatus in which the effective inner width of the seat cushion is increased to the maximum.

A further object of this invention is to provide a seat reclining apparatus in which the tooth portion of the upper tooth is covered with the arm.

These and other objects can be achieved according to this invention by providing a seat apparatus for adjusting an inclining angle of a seat back to a seat cushion, comprising:

a base plate secured to the seat cushion;
an arm disposed on a seat back side of said base plate, secured to the seat back, pivotably supported by said base plate;
an upper tooth secured to said arm;
a lower tooth pivotably supported by said base plate, engaging said upper tooth; and
an operating structure pivotably supported by said base plate, operating said lower tooth to engage and disengage said lower tooth and said upper tooth.

DETAILED DESCRIPTION OF THE PREFERRED EMBODIMENTS

An embodiment of a seat reclining apparatus according to this invention will be described hereunder.

As shown in FIGS. 1 through 8, a seat reclining apparatus with a latch type lock structure is provided with a pair of base plates 20A, 20B secured to the outer side and the inner side of the seat cushion respectively. A pair of arms 30A, 30B are located on the inner side of the base plates 20A, 20B and are pivotably supported by the base plates 20A, 20B, respectively. The arms 30A, 30B are secured to the outer side and the inner side of the seat back respectively. A pair of upper teeth 40A, 40B are located between the base plates 20A, 20B and the arms 30A, 30B. The upper teeth 40A, 40B are secured to the arms 30A, 30B respectively, while a pair of lower teeth 50A, 50B are pivotably supported by the base plates 20A, 20B respectively. The lower teeth 50A, 50B engage and disengage the upper teeth 40A, 40B by operating a operating member 60A, 60B. A pair of upper rails 70A, 70B which constitute a seat slide structure are located on the inner side of the base plates 20A, 20B and are secured to the base plates 20A, 20B respectively.

This invention is characterized in that a gap 71 is produced between the base plate 20B and the lower tooth 50B, the upper rail 70B is located in the gap 71, and a lower outer form of the lower tooth 50B is formed along the outer form of the upper rail 70B. This invention is also characterized in that parts 21b of flange portions 21 of the base plates 20A, 20B, which parts 21b oppose the upper rails 70A, 70B are formed by bending the periphery portion of the base plate 20A, 20B outward. Further, this invention is characterized in that arms 30A, 30B are provided with a plurality of flange portions 30a on the peripheral portion thereof respectively, which flange portions 30a cover the tooth portion 40a of the upper teeth 40A, 40B.

This seat reclining apparatus will be described in detail hereinafter. First, the seat reclining apparatus on the outer side will be described.

Figure 1:
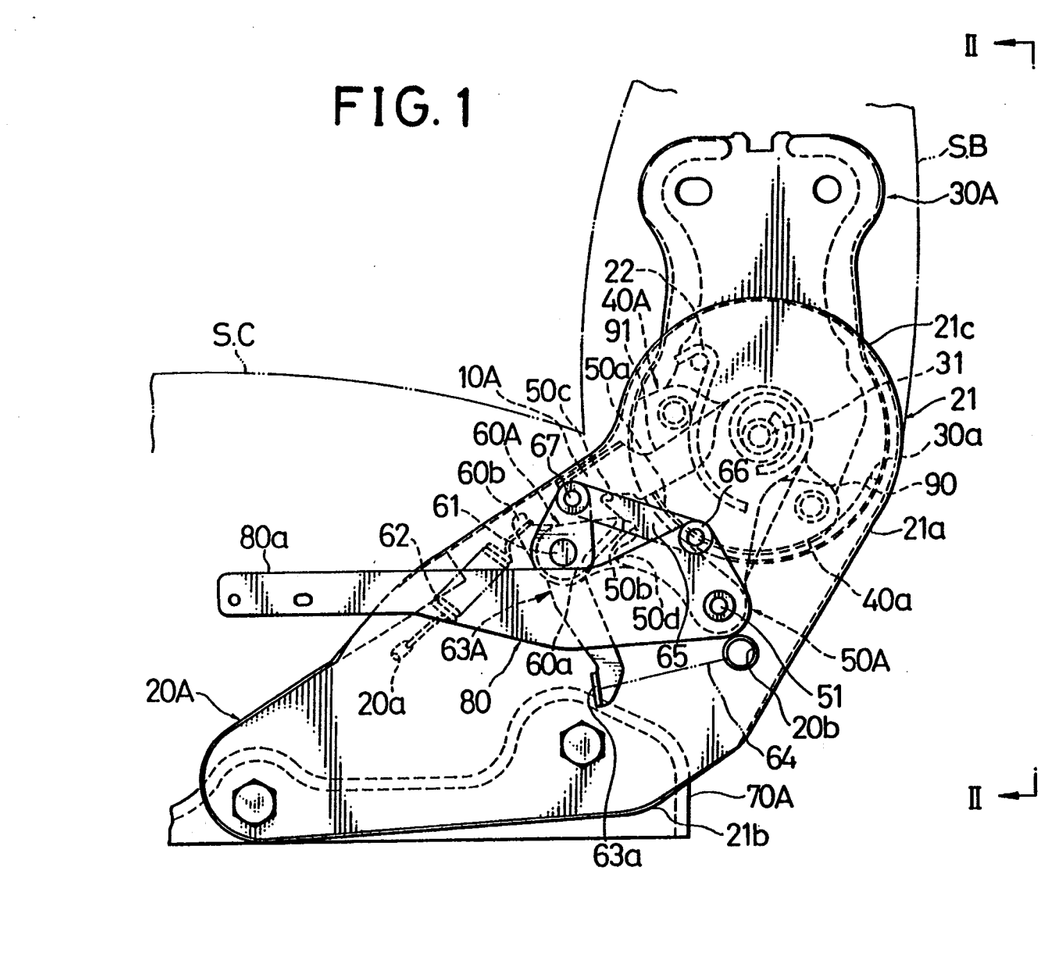
Fig. 1 is a front view showing a seat reclining apparatus on an outer side of a seat according to this invention.
Figure 2:
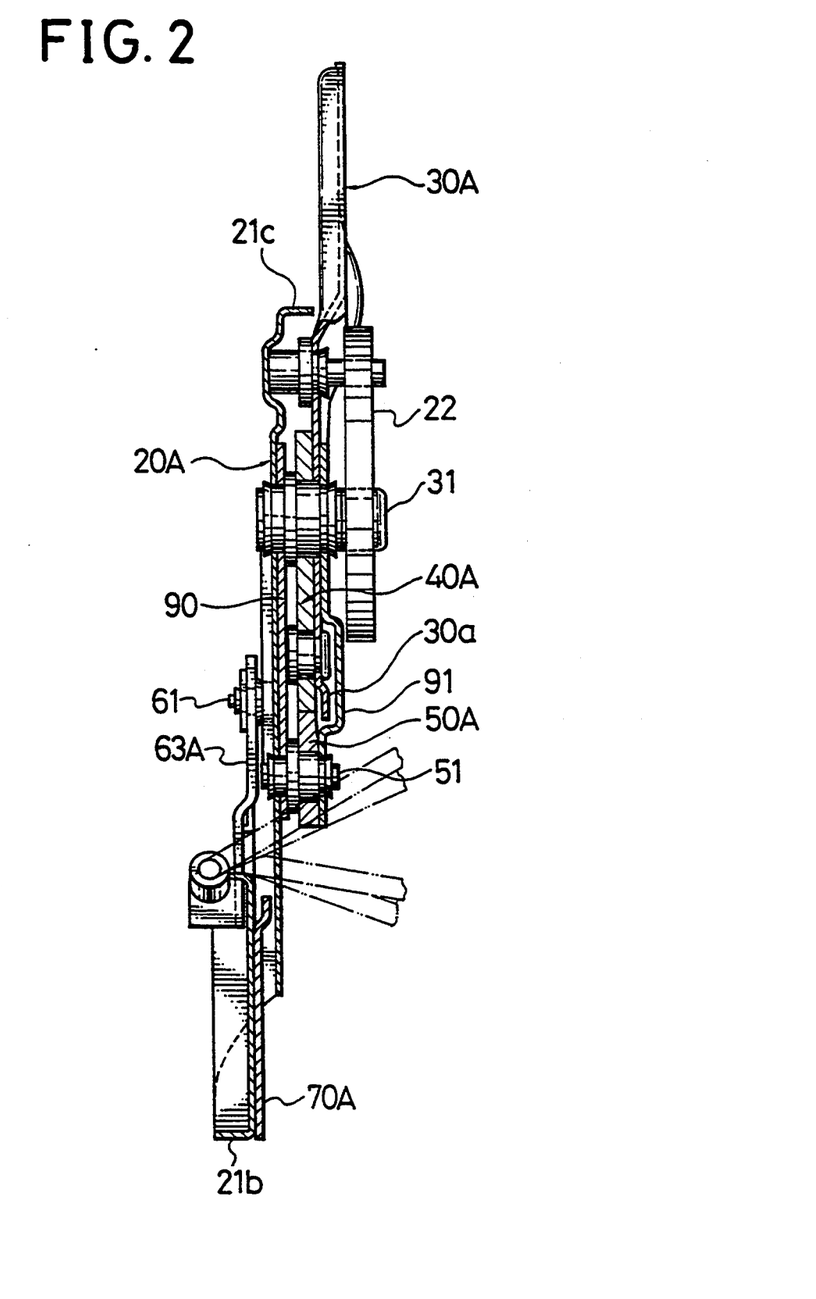
Fig. 2 is an elevational sectional view of the seat apparatus shown in FIG. 1.
Figure 7:
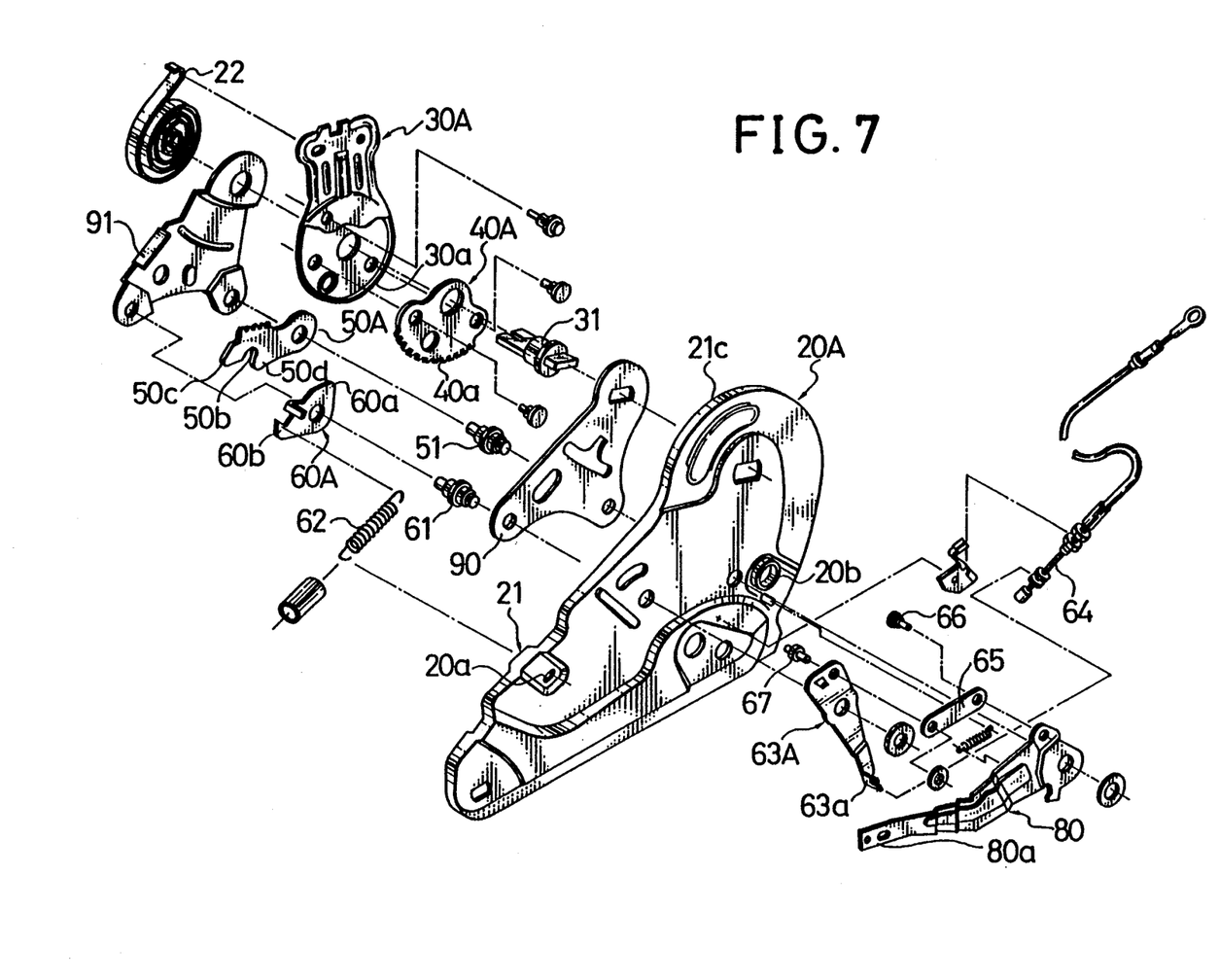
Fig. 7 is an exploded perspective view showing the seat reclining apparatus on the outer side.

The base plate 20A is secured to the outer side of the seat cushion S.C. The upper rail 70A which constitutes a seat slide structure is located at a lower portion of the inner side of the base plate 20A and is secured to the base plate 20A. The base plate 20A is provided with a flange portion 21 at a periphery portion thereof. The upper half 21a of the flange portion 21 is bent inward. A part of the flange portion 21, which opposes the upper rail 70A, is bent outward, that is, to the outside of the seat cushion S.C. The upper half 21a in the flange portion 21 is provided with a part 21c which over a semicircle for which the center corresponds to a first pivot 31 described later. An edge of the part 21c is close to the outer side surface of the arm 30A to prevent the lock structure 10A from being seen from the upper side.

The arm 30A is secured to the outer side of a seat back S.B and is pivotably supported by the base plate 20A through the first pivot 31. The upper tooth 40A is secured to the lower portion of the arm 30A and is provided at a lower edge thereof with a tooth portion 40a formed as an arc of which the center corresponds to the pivot 31. The lower tooth 50A is pivotably supported at the proximal end by the base plate 20A through a second pivot 51 and is provided at an upper edge on the free end thereof with a tooth portion 50a which engages the tooth portion 40a of the upper tooth 40A. The lower tooth 50A is also provided at a lower edge on the free end thereof with a pair of projection 50c, 50d located on both sides of a recess 50b. The arm 30A is provided at a lower periphery portion thereof with a flange portion 30a which is located away from the upper tooth 40A. The flange portion 30a has a predetermined width and extends over a circumference of which the center corresponds to the pivot 31. The flange portion 30a extends so as to cover the tooth portion 40a of the upper tooth 40A and the vicinity thereof.

The operating member 60A is pivotably supported at the proximal end thereof by the base plate 20A through a third pivot 61. A cam portion 60a which engages the recess 50b and the projections 50c, 50d is provided at one free end of the operating member 60A. A hook portion 60b is also provided at the other free end of the operating member 60A. One end of a tension spring 62 engages a hook portion 60b and the other end of the tension spring 62 engages an engaging opening 20a formed in the base plate 20A. The operating member 60A is moved counterclockwisely around the pivot 61 by the tension force of the tension spring 62. A connecting member 63A engages the operating member 60A and one end of the wire 64 is connected to an lower free end of a connecting member 63A. The other end of the wire 64 extends through openings 20b, 20c formed in the base plates 20A, 20B and is connected to a free end of a connecting member 63B on the inner side.

An operating lever 80 for manipulating the operating member 60A is pivotably supported at the proximal end thereof by the base plate 20A through the second pivot 51. The operating lever 80 is provided with a handle portion 80a extending forward. One end of a connecting rod 65 is pivotably connected through a pin 66 to a free end extended upward in the proximal end of the operating lever 80. The other end of the connecting rod 65 is pivotably connected through a pin 67 to an upper free end of the connecting member 63A.

One end of each of the first, the second and the third pivot 31, 51, 61 is secured to the base plate 20A through a reinforcement plate 90, while the other ends of these pivot 31, 51, 61 are secured to a holder plate 91 respectively. A spiral spring 22 is mounted on the first pivot 31, which spiral spring 22 move the arm 20A counterclockwisely about the first pivot 31.

Next, the seat reclining apparatus on the inner side will be described.

Figure 3:
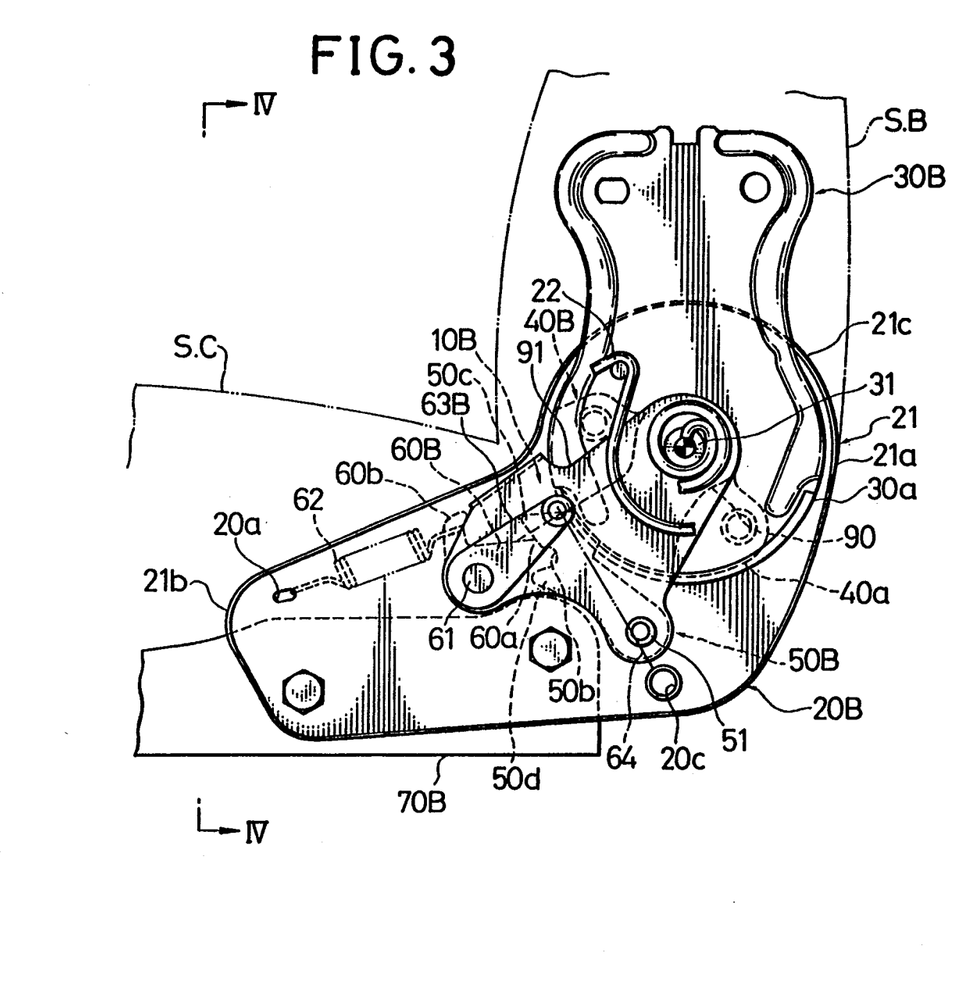
FIG. 3 is a front view showing a seat reclining apparatus on the inner side of the seat according to this invention.
Figure 4:
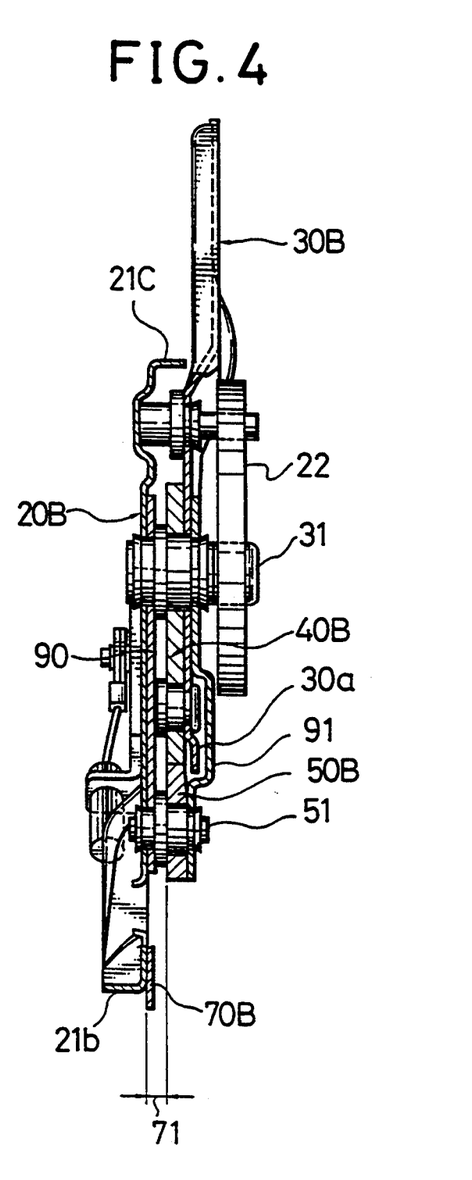
FIG. 4 is a sectional elevation of the seat reclining apparatus shown in FIG. 3.
Figure 8:
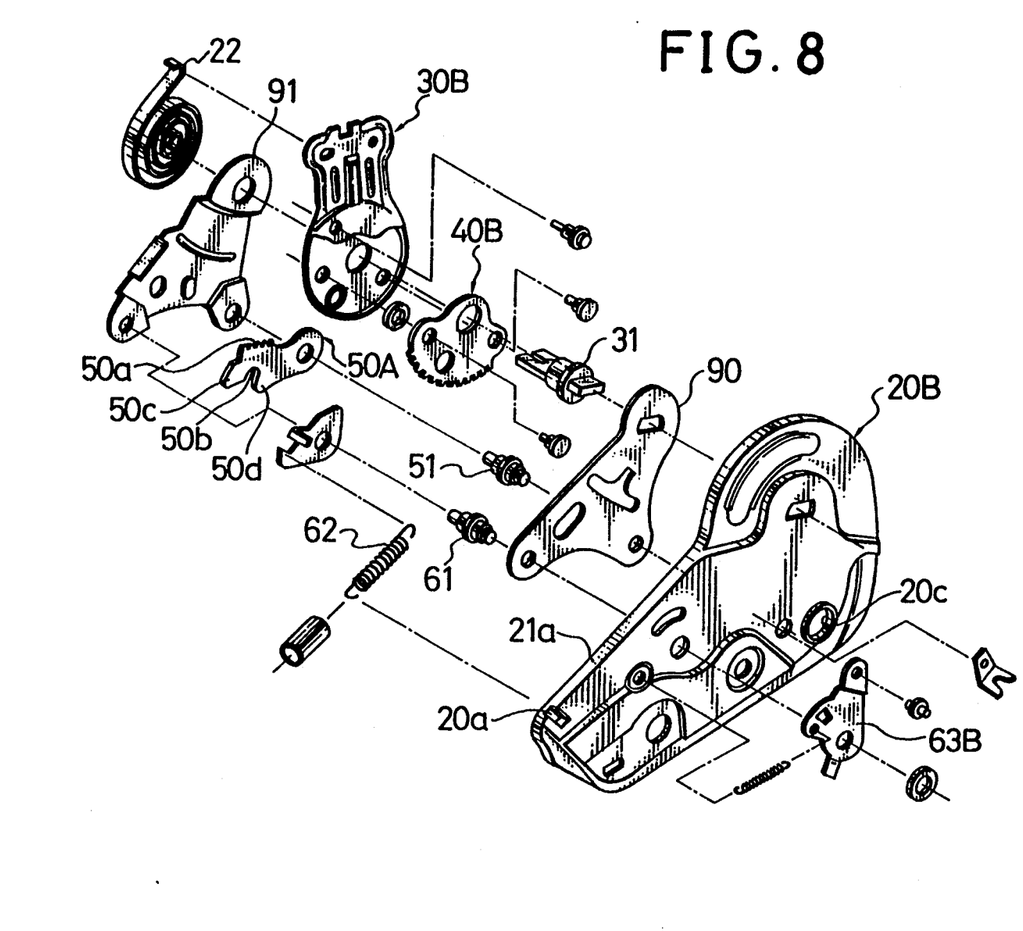
FIG. 8 is an exploded perspective view showing the seat reclining apparatus on the inner side.

The seat reclining apparatus on the inner side is not provided with the connecting rod 65 and the operating lever 80, and the upper rail 70B is located at the upper position of the upper rail 70A on the outer slide. Consequently, the outward form on the lower side of the lower tooth 50B is formed along the outward form of the upper rail 70B. A gap 71 is produced between the base plate 20B and the lower tooth 50B, and the upper rail 70B is disposed in the gap 71. The rest of the configuration of the seat reclining apparatus on the inner side is substantially the same as for the seat reclining apparatus on the outer side, so a duplicate explanation is omitted by adding a similar reference number to that on the outer side to the same part as that on the outer side.

Figure 5:
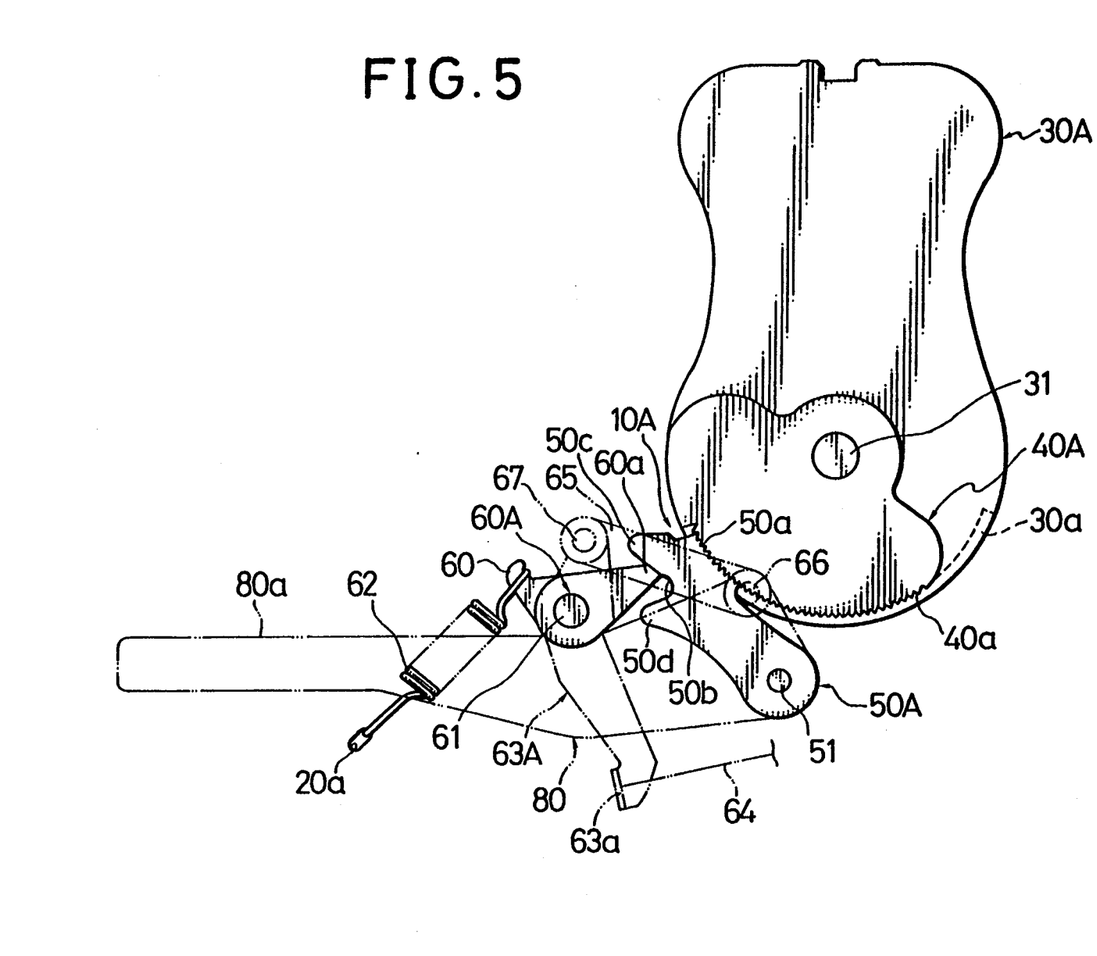
FIG. 5 and 6 are explanatory views showing the operation of a lock structure when locking in the seat reclining apparatus on the outer side.

When the lock structure 10A is in a locked condition, as shown in FIG. 5, the cam portion 60a of the operating member 60A is pressed against the projection 50c of the lower tooth 50A by the spring force of the tension spring 62, so that the lower tooth 50A pivots clockwise on the pivot 51. Thus the tooth portion 50a engages the tooth portion 40a of the upper tooth 40A.

Figure 6:
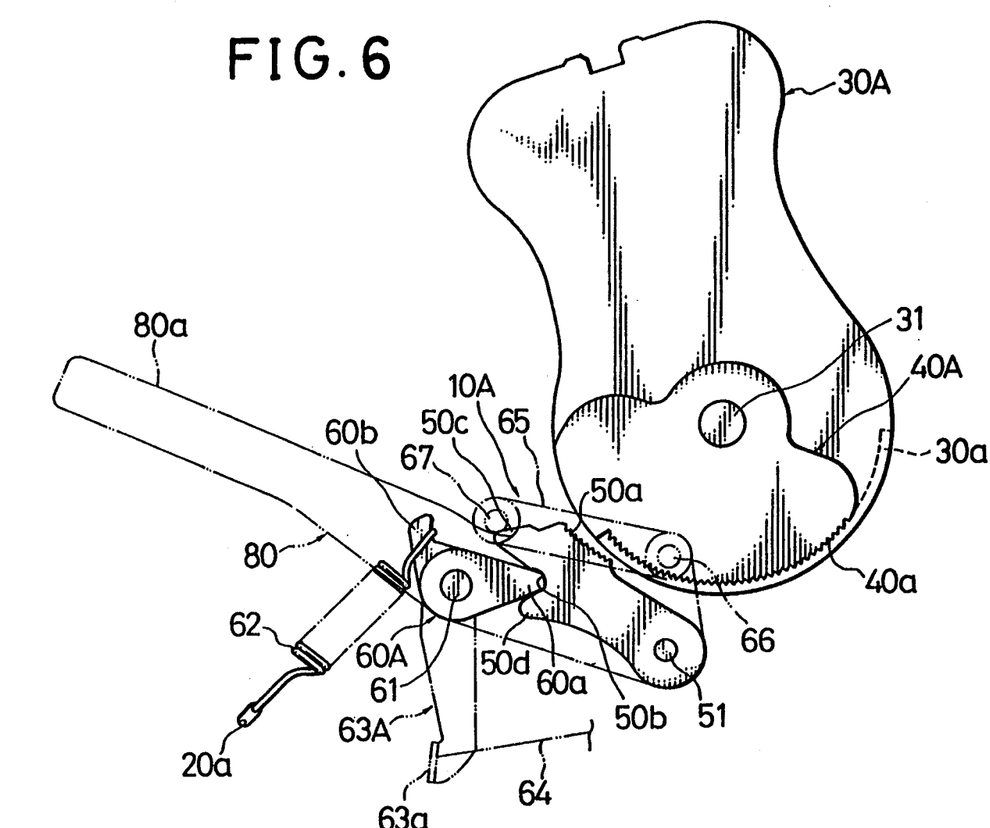

When reclining the seat back S.B, the operating lever 80 is pulled clockwise against the spring force of the tension spring 62. Then, the operating member 60A pivots clockwise on the pivot 61 through the connecting rod 65 and the connecting member 63A, so that the cam portion 60a of the operating member 60A engages the recess 50b and the projection 50d causing the lower tooth 50A to counterclockwise on the pivot 51. In this time, the operating member 60B of the lock structure 10B on the inner side also pivots clockwise on the pivot 61, being pulled by the wire 64 through the connecting member 63B to cause the lower tooth 50B to pivot counterclockwise on the pivot 51, similar to that on the outer side. Thus, the engagement between the tooth portions 40a of the upper teeth 40A, 40B and the tooth portions 50a of the lower teeth 50A, 50B is cancelled. Consequently, each arm 30A, 30B pivots counterclockwisely on the pivot 31 from the spring force of the spiral spring 22 to release the locked condition as shown in FIG. 6.

When setting the seat back S.B at a desired inclining angle, the passenger pivots the seat back S.B to the desired inclining angle, and then releases the operating lever 80. Then, the operating lever 80 pivots counterclockwise on the pivot 51 from the spring force of the tension spring 62 to return to the former position. By this return action, the operating members 60A, 60B pivot counterclockwise on the pivot 61, so that the cam portions 60a press against the projections 50c of the lower teeth 50A, 50B to pivot the lower teeth 50A, 50B clockwise. Thus, each tooth portion 40a of the upper teeth 40A, 40B reengages each tooth portion 50a if the lower teeth 50A, 50B, so that each lock structure 10A, 10B is locked as shown in FIG. 5. Consequently, it is possible to set the seat back S.B at a desired inclining angle.

Now, with the seat reclining apparatus according to this embodiment, because the upper fall 70B is disposed in the gap 71 produced between the base plate 20B and the lower tooth 50B, while the lower tooth 50B pivots counterclockwisely about pivot 51, that is pivots downward, when cancelling the locked condition of the locking structure 10A, 10B, the lower edge of the lower tooth 50B do not abut against the upper rail 70B. Consequently, the upper rail 70B can be located to the base plate 20B at a position close to the pivot 51 of the lower tooth 50B to make it possible to miniaturize the base plate 20B and the seat reclining apparatus as a whole.

Moreover, with the seat reclining apparatus of this embodiment, the rigidity of the fitting portion of the base plate 20A, 20B for upper rail 70A, 70B is improved because of the flange portion 20b. In addition, since the flange portion 20b is bent outward, it is not required to form a rib as in the conventional apparatus to make it possible to increase the effective inner width to the maximum.

Further, with the seat reclining apparatus of this embodiment, the flange portion 30a formed in the peripheral portion of each arm 30A, 30B extends to the under position of the tooth portion 40a of the upper teeth 40A, 40B, so that the tooth portion 40a and the vicinity thereof of the upper teeth 40A, 40B are covered by the flange portion 30a. Consequently, the tooth portion 50a of the lower teeth 50A, 50B engaging the upper teeth 40A, 40B is also covered by the flange portion 30a. As a result, the upper teeth 40A, 40B pivot with the arms 30A, 30B, the tooth portion 50a does not contact the seat cushion S.C, making it possible to prevent oil supplied to the tooth portion 50a from adhering to the seat cushion S.C.

In addition, the seat reclining apparatus according to this invention is not limited to the seat reclining apparatus with lock structures on both sides of the seat, and can be applied to a seat reclining apparatus with one lock structure on one side of the seat.

What is claimed is:

1. A seat reclining apparatus for adjusting an inclining angle of a seat back to a seat cushion, comprising:
   a base plate secured to the seat cushion;
   an arm disposed on a seat back side of said base plate, secured to the seat back, pivotably supported by said base plate;
   an upper tooth secured to said arm;
   a lower tooth disposed so as to produce a gap between said base plate and said lower tooth, pivotably supported by said base plate, engaging said upper tooth;
   an operating structure pivotably supported by said base plate, operating said lower tooth to engage and disengage said lower tooth and said tooth; and
   an upper rail constituting a seat slide structure, secured to said base plate, disposed in the gap between said lower tooth and said base plate;
   wherein a lower outward form of said lower tooth is formed along an outward form of said upper rail.

2. A seat reclining apparatus according to claim 1, wherein
   said base plate has a flange portion adjoining said upper rail, and wherein a part of said flange portion extends away from said upper rail.

3. A seat reclining apparatus according to claim 1, wherein
   said arm has a flange portion formed to cover a tooth portion of said upper tooth.

* * * * *